US005418021A

United States Patent [19]

Kim

[11] Patent Number: 5,418,021

[45] Date of Patent: May 23, 1995

[54] TINTED-GLASS WINDOW ASSEMBLY

[76] Inventor: Chang S. Kim, 18507 - 70th Ave. Court E, Puyallup, Wash. 98373

[21] Appl. No.: 155,490

[22] Filed: Nov. 22, 1993

[51] Int. Cl.[6] ............................................ B32B 3/10

[52] U.S. Cl. ........................................ 428/14; 428/34; 428/38; 52/311.2

[58] Field of Search ............................ 428/14, 34, 38; 52/311.2, 311.2

*Primary Examiner*—Alexander S. Thomas

*Attorney, Agent, or Firm*—David L. Tingey

[57] ABSTRACT

An insulating, tinted glass window assembly of components that can be efficiently assembled and disassembled for repair or cleaning provides a three-layer glass window assembly having a tinted-glass layer sandwiched between two clear, transparent glass panes. The tinted-glass layer is formed by a lattice inner frame holding a plurality of preformed tinted glass sized to fit in the lattice frame. The inner frame also holds the clear, transparent glass panes resting on the inner frame in a spaced-apart relation to the internal tinted glass layer. Thus, two insulating layers of air is presented within each of which air movement is restricted by the lattice of the inner frame, thereby further improving insulation properties of the assembly. The perimeter frame 20 and the inner frame each comprise two matching members in face-to-face contact with the inner frame perimeter fitting into a channel in the perimeter frame, and the clear, transparent glass panes secured to the outer frame thereby holding the assembly together without permanent adhesives.

6 Claims, 6 Drawing Sheets

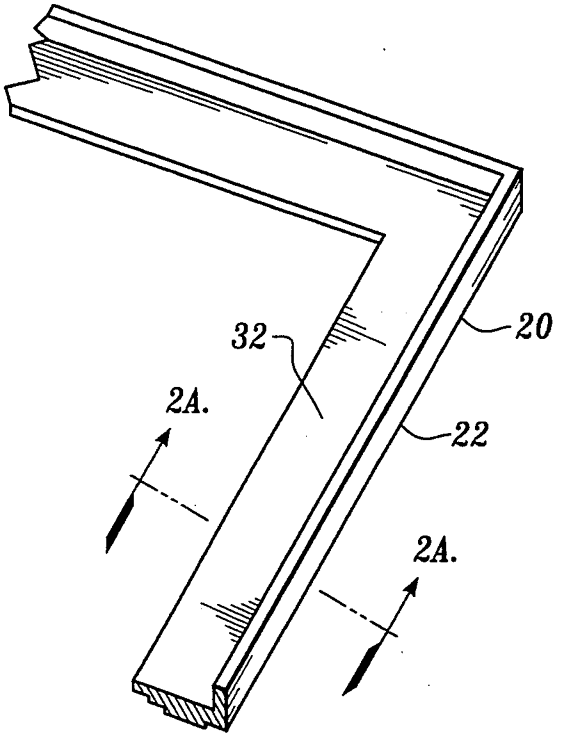
FIG. 2.
FIG. 2A.
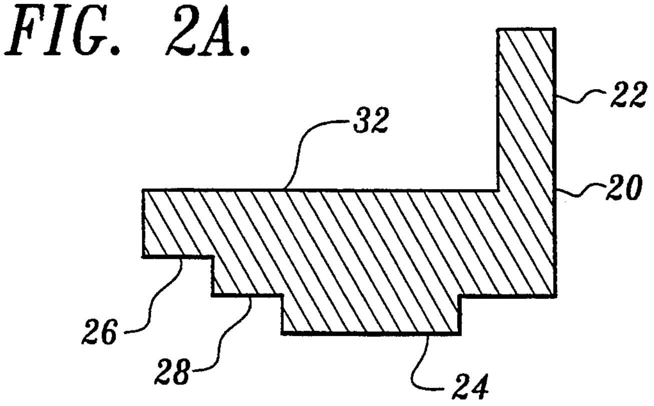

TINTED-GLASS WINDOW ASSEMBLY

BACKGROUND

This invention relates to decorative window panes, and more particularly to a laminar assembly of glass panes with a plurality of inner panes of tinted glass held within an lattice network of inner frames between clear outer panes.

Stained glass windows are common. Traditionally, such windows are constructed with lead cames, adhesives, or solder holding together an assembly of tinted glass pieces. Often, a curing process is required to permanently secure the assembly. When a piece of glass of the window is broken, it must be removed and the window rebuilt with a new lead came. The window assembly characteristically is handmade and therefore is expensive as is its repair.

Insulating windows are also common, typically comprising two glass panes secured in a window frame, although windows with more than two panes are also known. A frequent problem with insulating windows is that moisture and dirt accumulate within the window where it is impossible to clean without taking the window apart. However, the such windows are not designed to be taken apart.

It is also well-known that insulation properties are largely due to the low thermal conductivity of air and are improved when air movement is restricted within a volume such as a window.

This invention provides an improved 3-pane insulating window with restricted air movement that simulates a stained-glass window with leaded cames which simultaneously is comparatively inexpensive to assemble and may be disassembled for repair or cleaning without destroying the window assembly.

SUMMARY OF THE INVENTION

It is the object of this invention to provide a laminar assembly of tinted glass pieces sandwiched between but spaced apart from clear glass panes in a manner that appears to be hand-made stained glass held together in lead cames but in fact is preformed frames with matching precut or preformed glass or plastic pieces held in place by the frames in a cost-effective manner that makes stained glass windows more affordable. It is also an objective that with the new laminar assembly of three glass panes, the inner pane being stained glass or plastic, the window also presents an effective insulated window with two inner layers of air, each with limited air movement for increased effective insulation. A further object is to provide a window assembly with a frame that can easily be dissembled and reassembled for ease of installing and replacing damaged glass and tinted glass pieces.

These objectives are achieved in the present invention in that a perimeter frame and an inner frame that appears as lead cames comprise upper members and matching lower members that when placed together form a lattice for grooves running longitudinally with the frame into which solid glass or plastic pieces fit. In assembly, a lower perimeter frame member is placed around the perimeter of a first clear, transparent glass pane. A lower inner frame member is then placed on inner shelfs of the perimeter frame and onto the glass. A plurality of tinted glass or plastic pieces are then placed on the lower inner frame member until the lattice is filled, and then the upper inner frame member and upper perimeter frame member is placed over the pieces onto the lower member. A second clear, transparent glass pane is then placed over the assembly, and the upper and lower perimeter frame members are connected together securely binding the laminar assembly into a single unit. Inner frame members on which the first and second clear glass panes rest hold them each in a spaced-apart relation with the inner tinted glass or plastic pieces. The unit is similarly disassembled for repair, for example, by disconnecting the perimeter frame members and removing the first clear glass pane.

BRIEF DESCRIPTION OF THE DRAWINGS

FIG. 2 is a perspective view of segment of a corner section of an perimeter frame upper member showing an upper shelf on which a glass pane rests.

FIG. 2*a* is a cross-sectional end view of the perimeter frame upper member showing a tongue extending from its bottom and an inverted shelf on its inner side.

DETAILED DESCRIPTION OF THE PREFERRED EMBODIMENT

Figure 1:
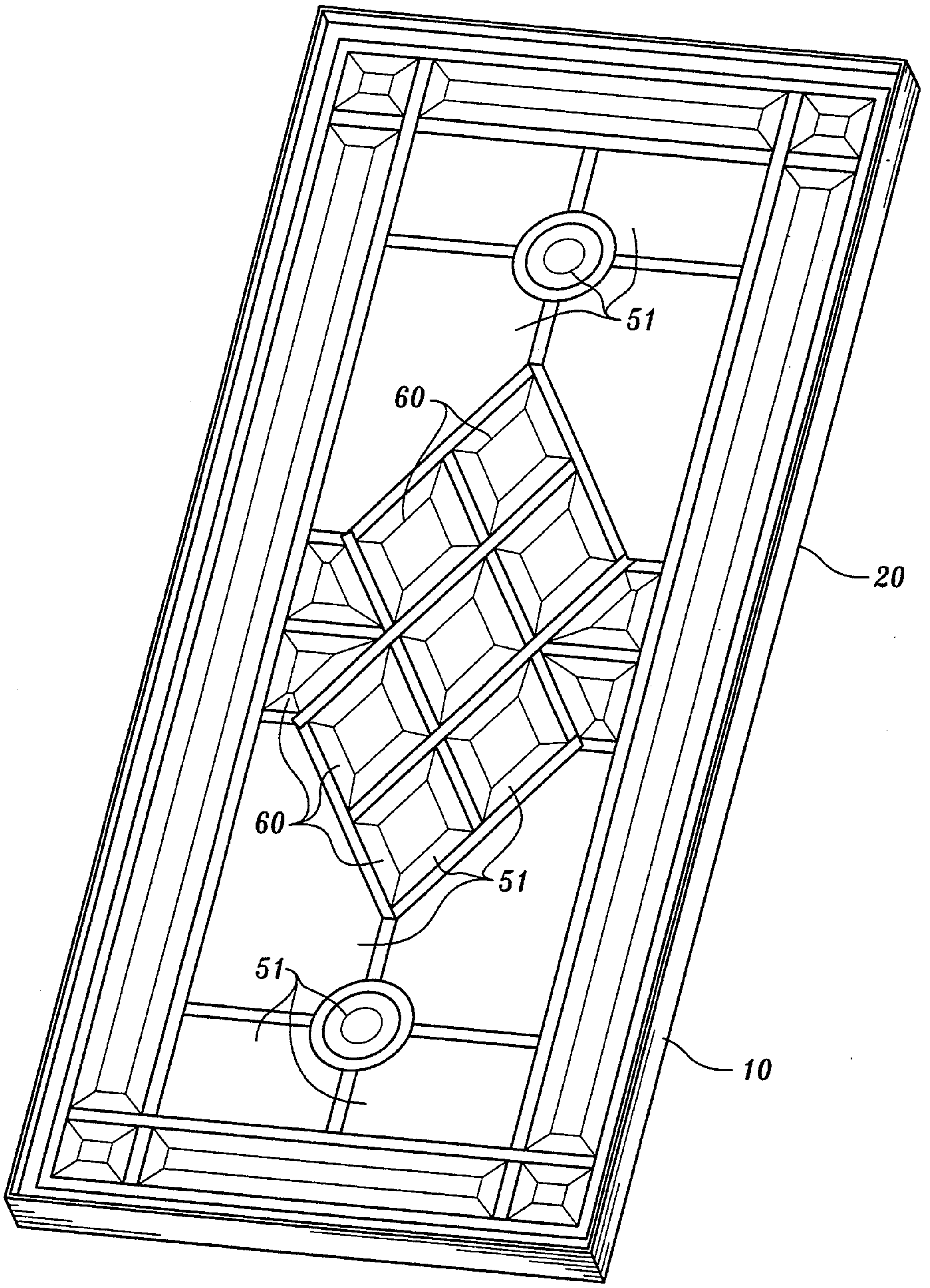
FIG. 1 is a perspective view of an assembled three-layered glass window having an inner lattice frame with tinted glass or plastic therein spaced apart from outer glass panes.
Figure 3:
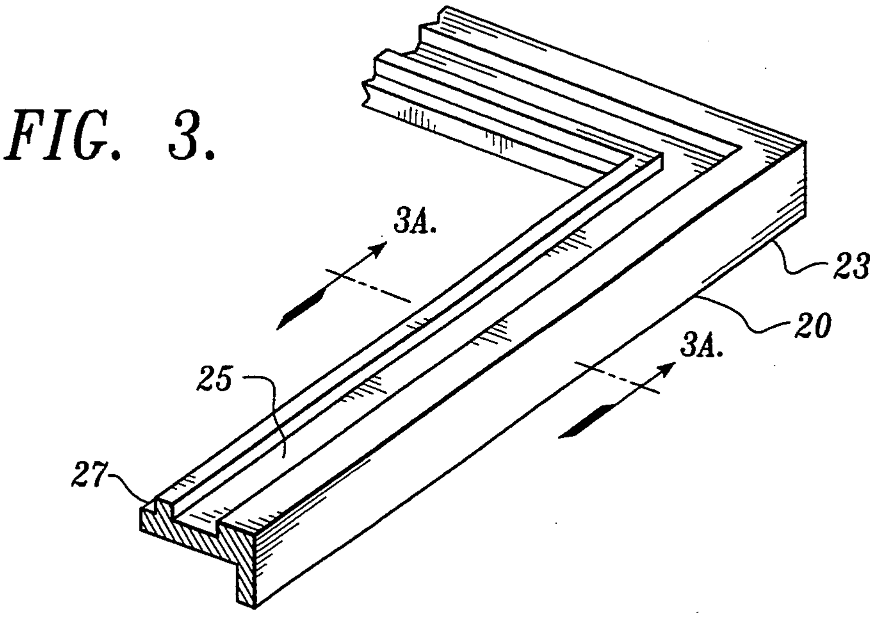
FIG. 3 is a perspective view of a corner section segment of an perimeter frame lower member showing an inverted shelf which fits over and around the perimeter of a glass pane and also showing a groove running longitudinally with the member on its top into which the matching tongue of the perimeter frame upper member fits.
Figure 3A:
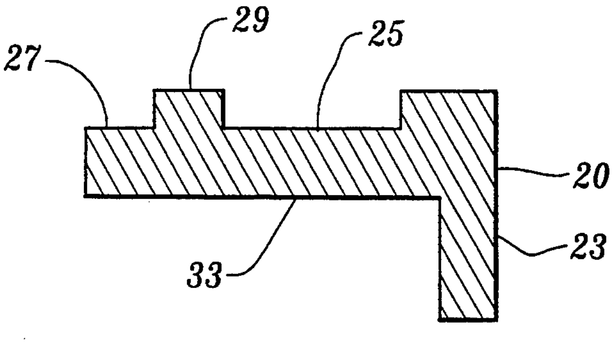
FIG. 3*a* is a cross-sectional end view of the perimeter frame lower member showing a shelf on its inner side matching the inverted shelf of the perimeter frame upper member.
Figure 4:
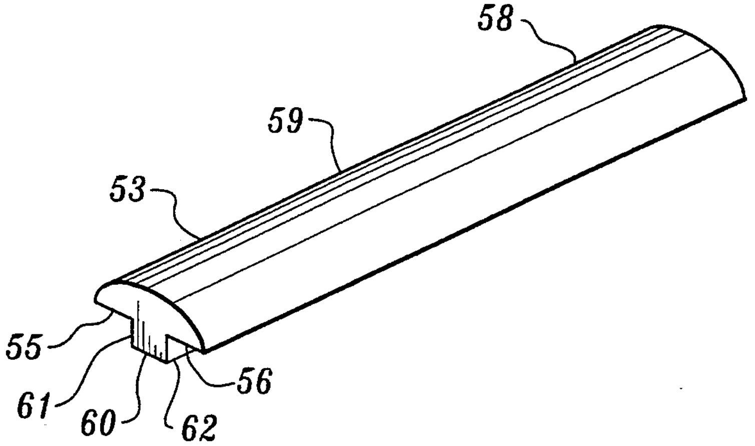
FIG. 4 is a perspective view of a segment of an inner frame upper member showing an inverted shelf on each side into which tinted glass or plastic pieces fit.
Figure 5:
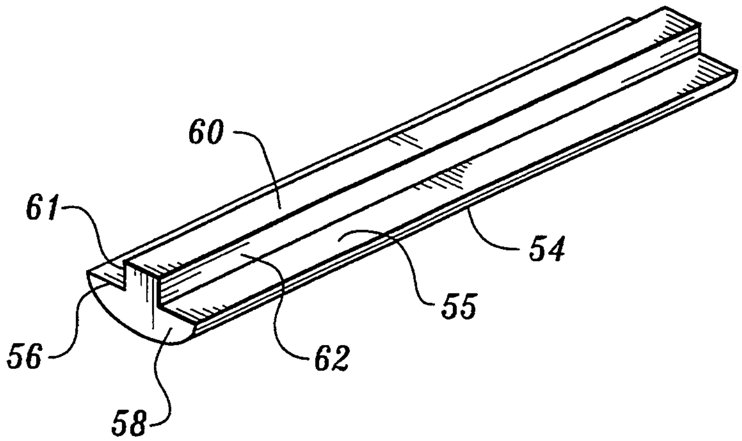
FIG. 5 is a perspective view of a segment of an inner frame lower member showing a shelf on each side onto which tinted glass or plastic pieces rest.
Figure 6:
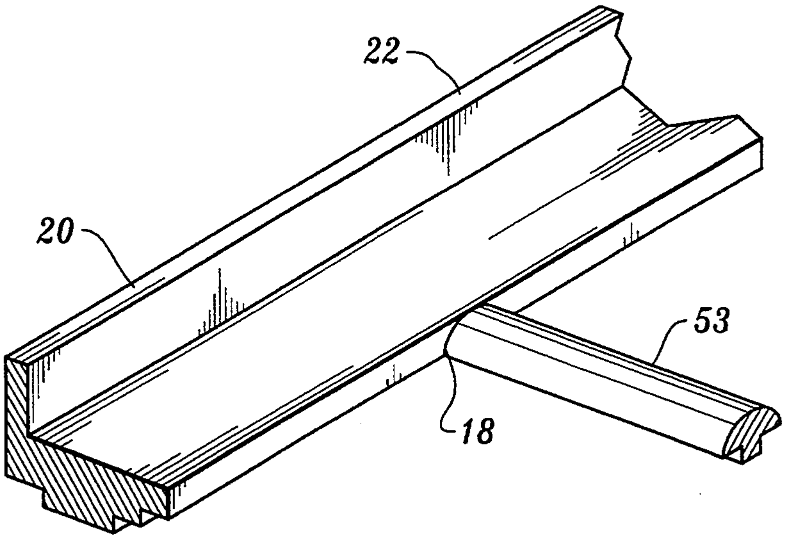
FIG. 6 is a perspective view of a segment of an inner frame upper member connected to the perimeter frame upper member.
Figure 7:
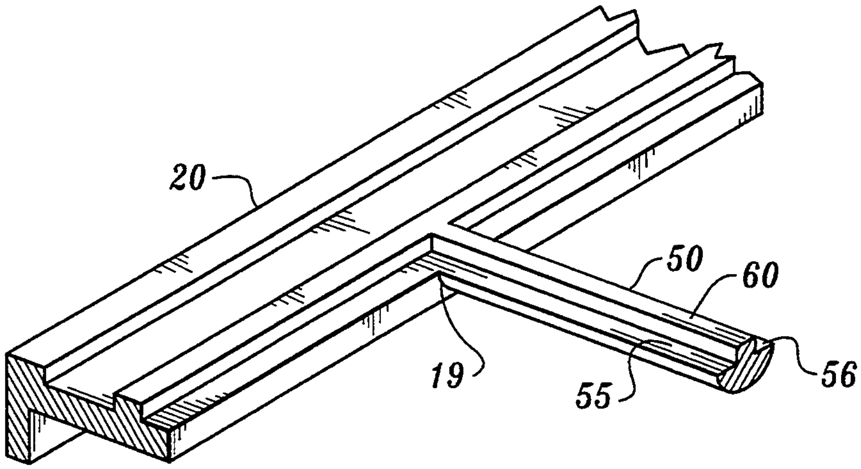
FIG. 7 is a perspective view of a segment of an inner frame lower member connected to the perimeter frame lower member.
Figure 8:
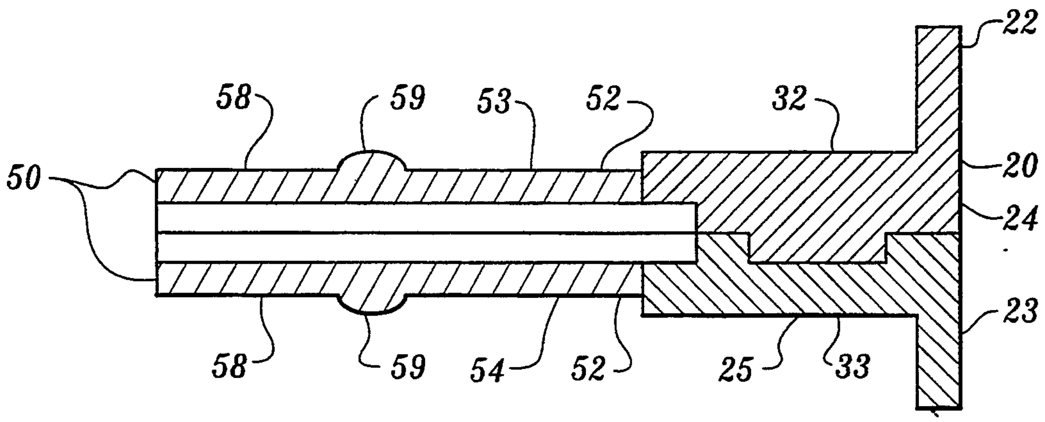
FIG. 8 is a cross-sectional side view of an assembled three-layered glass window showing an inner frame perimeter abutting the perimeter frame with tinted glass fitting in the perimeter frame channel.

Referring to the Figures, the insulated stained glass window assembly 10 of the present invention includes an perimeter frame 20 defining a perimeter of a window. The frame 20 has an upper member 22 and a lower member 23 in face-to-face contact and including a tongue 24 on one contact face extending into a matching longitudinal groove 25 in the other contact face.

The upper member 22 also has a corner cut 26 on its lower side 28, and similarly the lower member 23 has a corner cut 27 on its upper side 29, both cuts facing inwardly such that when the members are joined together, the two cuts form a channel 30 on the frame inward side 31 running longitudinally with the frame 20.

The upper member 22 also has an upper shelf 32 on which the first glass pane 40 rests, and the lower member has a similar lower shelf 33 on which the second glass pane 41 rests. The lower member 23 has a similar lower shelf 33 with the frame 20 then bordering all sides of the glass panes 40 and 41 with the perimeter frame channel 30 therebetween.

As shown in the figures, assembly also includes an inner frame 50 formed as a lattice with several small window openings 51. The inner frame also comprises matching upper and lower members 53 and 54 respectively joining the perimeter frame upper and lower members. Each inner frame member has an outer surface 58 with an extended portion 59 in contact with a transparent, clear glass pane and an inner surface 60 in face-to-face contact with each other. Each inner frame member also has corner cuts on its sides 61 and 62 forming shelves 55 and 56 such that when the members are in face-to-face contact the shelves are opposing and form an inner frame channel 57 on the sides of the inner frame around each lattice window opening sized to bind tinted glass therein. With the perimeter 52 of the inner frame 50 abutted against the perimeter frame inward side, the inner frame channel and the perimeter frame channel align such that a flat glass plate can fit and be supported securely in the combined channels.

In an alternative embodiment, perimeter frame upper member 22 and inner frame upper member 53 form a single upper frame 18. Likewise, perimeter frame lower member 22 and inner frame lower member 53 form a single lower frame 19.

The assembly 10 then also comprises a plurality of tinted glass or plastic pieces 60 precut or preformed and shaped to fit on the inner frame shelves 55 and 56 and bound between them as the inner frame upper and lower members 53 and 54 are placed together in face-face-contact. The inner frame members 53 and 54 are held together in the inner channel 30 of the perimeter frame 20.

Figure 9:
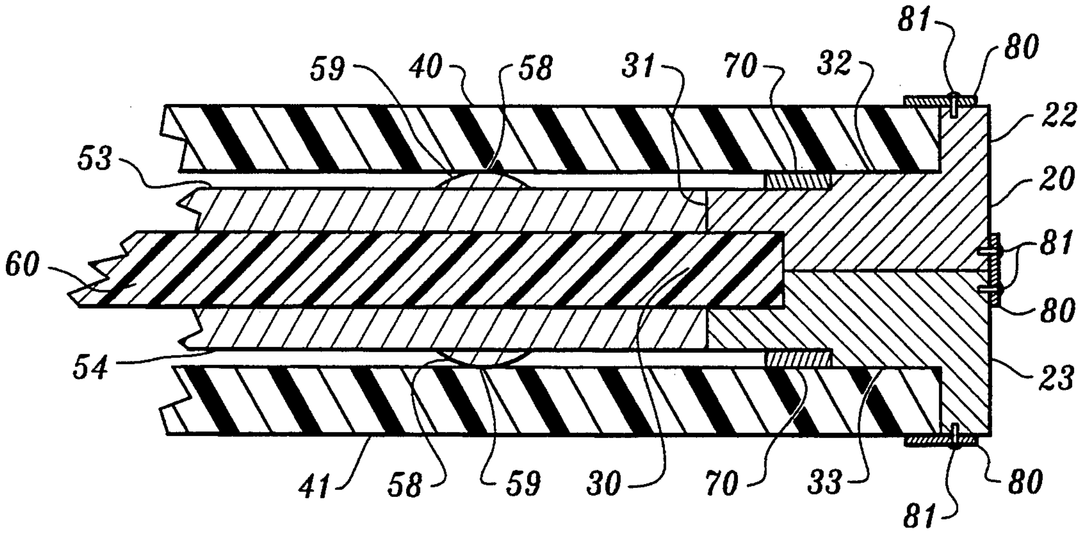
FIG. 9 is a cross-sectional view of an assembled three-layered glass window showing an end view of an lattice inner frame with tinted glass or plastic therein spaced apart from outer glass panes.
Figure 10:
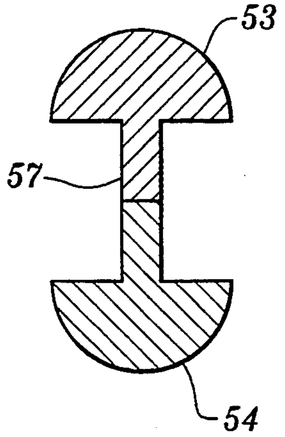
FIG. 10 is a cross-sectional view of the inner frame upper and lower members together forming innerframe channels.

As illustrated in FIG. 9, the inner frame 50 with the clear glass panes 40 and 41 resting thereon holds the clear glass panes 40 and 41 spaced apart from the tinted glass or plastic pieces 60, establishing air pockets on each side of the tinted glass 60 between the clear glass 40 and 41 and the inner frame 50, with each inner frame lattice window opening 51 forming an separate air pocket. Thus, with three layers of glass defining two levels of air confinement, and with air movement prevented within each air level between lattice openings, the window assembly 10 presents a highly effective and decorative insulating window.

The assembly 10 is held together as a unit by joining the clear, transparent glass panes 40 and 41 to the respective upper and lower shelves of the perimeter frame 20 with the plurality of tinted glass or plastic pieces 60 fit in the inner frame lattice sandwiched between and held in the perimeter frame 20 inner channel. The assembly 10 may be disassembled as necessary, for example, to repair a broken or cracked pane, by removing the clear glass pane or panes 40 and 41 from the perimeter frame 20. Insulating material 70 can be added between the clear glass panes 40 and 41 and the perimeter shelves 32 and 33 to prevent or minimize air from passing through the assembly 10.

The clear glass panes 40 and 41 can be joined to the perimeter frame 20 and the perimeter upper and lower frames to each other in any of several ways. For example, a securing bar 80 can be mounted with conventional screws 81 on the perimeter frame 20 at the frame shelves 32 and 33 over each clear pane 40 and 41, respectively, securing the panes between each bar 80 and shelf 32, 33 and similarly between the frame members. The tinted glass pieces, inner frame members, perimeter frame 20 members and clear glass panes 40 and 41 remain bound in place only by the assembly 10, free from permanent adhesives, with the advantage that the window can be assembled quickly and inexpensively and can be disassembled quickly for repair, cleaning, or the like. In the alternative, the insulating material 70 can be an adhesive, or an adhesive can be combined with the insulating material 70, that binds the clear panes 40 and 41 to the perimeter shelves 32 and 33. For the unit to be able to be disassembled, the insulating adhesive 70 should be removable.

It is clear that certain materials can be substituted for those described, such as plastic for glass, and different but equivalent implementations of the invention can be imployed without changing the import of this described invention. It is the intention that such substitutions and equivalent embodiments be included in this disclosed invention.

Having described the invention, what is claimed is:

1. An insulating, tinted glass window assembly that can be disassembled for repair or cleaning, simulating a stained glass window having lead cames, comprising a first and a second transparent, clear glass pane, a perimeter frame defining a perimeter of a window including an upper member and a lower member in face-to-face contact and including a tongue on one contact face extending into a matching longitudinal groove in the other contact face, the upper member having a corner cut on its lower side, the lower member having a corner cut on its upper side, both corner cuts facing inwardly such that when the members are set together in face-to-face contact, the two cuts form a perimeter frame channel in the perimeter frame inward side running with the frame, the upper member also having an upper shelf on which the first glass pane rests, and the lower member having a similar lower shelf on which the second glass pane rests such that the perimeter frame borders the glass panes with the perimeter frame channel therebetween, an inner frame defining a lattice with several small window openings therein, the inner frame also comprising matching upper and lower members respectively joining the perimeter frame upper and lower members, each inner frame member having an outer surface with an extended portion in contact with a transparent, clear glass pane and an inner surface in face-to-face contact with each other and each inner frame member also having corner cuts on its sides forming shelves such that when the members are in face-to-face contact the shelves are opposing and form an inner frame channel on the sides of the inner frame around each lattice window opening sized to bind tinted glass therein, a plurality of tinted glass or plastic pieces preformed and shaped to fit in the inner frame and perimeter frame channels within the lattice window openings and bound in the frame channels as the frame upper and lower members are set together in face-to-face contact forming a tinted glass layer such that a three-layer glass window assembly is formed with the inner frame separating the tinted glass layer from and in spaced-apart relation with the clear glass panes, thereby establishing air pockets on each side of the tinted glass between the clear glass and the inner frame, means joining the clear, transparent glass panes to the respective upper and lower shelves of the perimeter frame with the tinted glass layer sandwiched between them in spaced-apart relation and held in the perimeter frame inner channel.

2. The insulating, tinted glass window assembly of claim 1 wherein the extended portion of the outer surface of the inner frame members run the extent of the frame member and maintain contact with a transparent, clear glass pane such that the extended portion provides an air separation between adjacent lattice window sections to prevent air movement between the sections for improved insulation between the clear glass panes.

3. The insulating, tinted glass window assembly of claim 1 wherein the inner frame is separable from the perimeter frame and said inner frame has a perimeter that fits in the perimeter frame channel such that the inner frame members are held together within the inner channel of the perimeter frame.

4. The insulating, tinted glass window assembly of claim 1 wherein means to join the clear, transparent glass panes to the respective upper and lower shelves of the perimeter frame comprises a securing bar secured to the perimeter frame extending over each clear, transparent glass pane sufficiently to secure it to the perimeter frame shelf such that the tinted glass pieces, inner frame members, perimeter frame members and clear glass panes remain bound in place only by the assembly, free from permanent adhesives, with the advantage that the window can be assembled quickly and inexpensively and similarly can be disassembled quickly for repair or cleaning.

5. The insulating, tinted glass window assembly of claim 1 wherein means to join the clear, transparent glass panes to the respective upper and lower shelves of the perimeter frame comprises a removable adhesive between each clear, transparent glass pane and the respective perimeter frame shelf such that the tinted glass pieces, inner frame members, perimeter frame members and clear glass panes remain bound in place only by the assembly with the advantage that the window can be assembled quickly and inexpensively and similarly can be disassembled quickly for repair or cleaning.

6. The insulating, tinted glass window assembly of claim 1 further comprising an insulating material between each clear, transparent glass pane and the respective perimeter frame shelf.

* * * * *